United States Patent

[11] 3,578,267

[72] Inventor Edward Kazmarek
Reseda, Calif.
[21] Appl. No. 777,798
[22] Filed Nov. 21, 1968
[45] Patented May 11, 1971
[73] Assignee Lear Siegler, Inc.
Santa Monica, Calif.

[54] CONTROL SYSTEM WITH MULTIPLE FUNCTION CAPABILITY
22 Claims, 5 Drawing Figs.

[52] U.S. Cl. .................................................. 244/77,
74/469, 74/519, 244/83
[51] Int. Cl. ...................................................... B64c 13/24
[50] Field of Search ........................................... 244/77, 77
(SE), 77 (F), 76, 83; 74/469, 519, 524;
318/20.245, 20.510

[56] References Cited
UNITED STATES PATENTS
480,450 8/1892 Briggs ........................... 74/519
2,489,924 11/1949 Oates ............................ 74/469
3,438,306 4/1969 Kazmarek ..................... 244/77

Primary Examiner—Milton Buchler
Assistant Examiner—James E. Pittenger
Attorney—Christie, Parker & Hale ABSTRACT: A first force-transmitting mechanism is adapted to move relative to a stationary frame responsive to a servoactuator. An element to be controlled is coupled to the first mechanism such that it moves with the first mechanism relative to the frame. A second force-transmitting mechanism is adapted to move relative to the frame in response to a manual input device. Mechanical coupling between the first and second mechanisms enables operation in one of two modes. In one mode, the mechanisms are coupled to move in a mutually independent manner relative to the frame within predetermined limits beyond which they move together. In addition to its normal function, the servoactuator operates responsive to a transducer that senses the displacement between the first and second mechanisms and returns the first mechanism to a null position relative to the second mechanism. In the other mode, the mechanisms are coupled to move together relative to the frame without appreciable play.

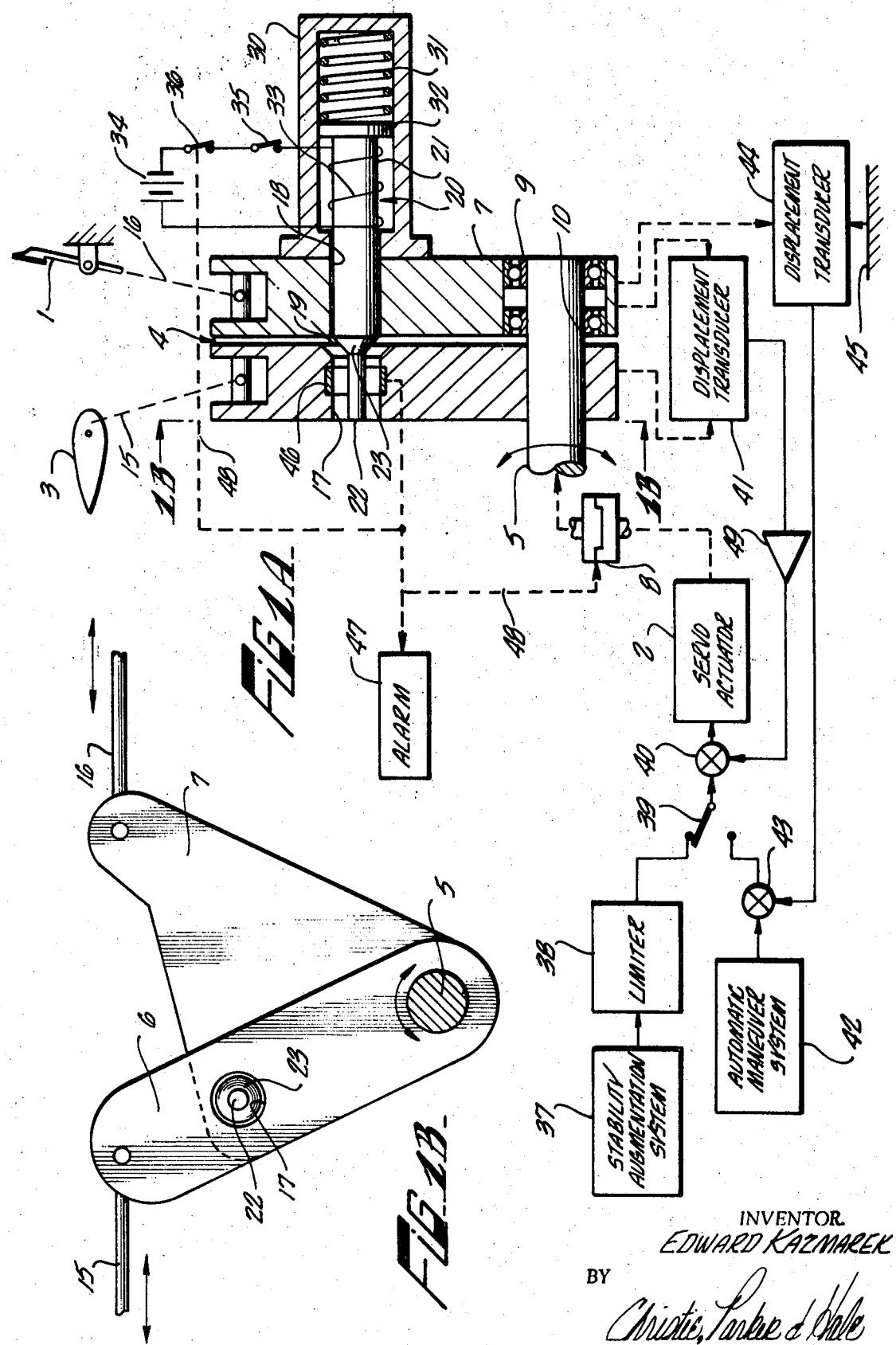

Patented May 11, 1971
3,578,267
2 Sheets-Sheet 2
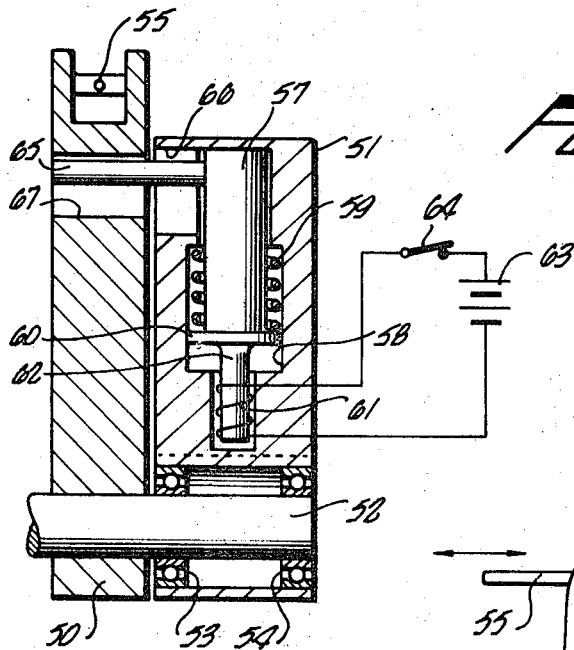
FIG_2A_
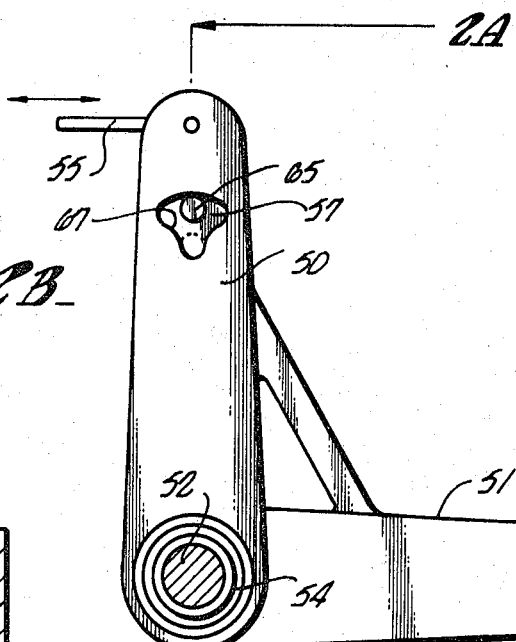
FIG_2B_
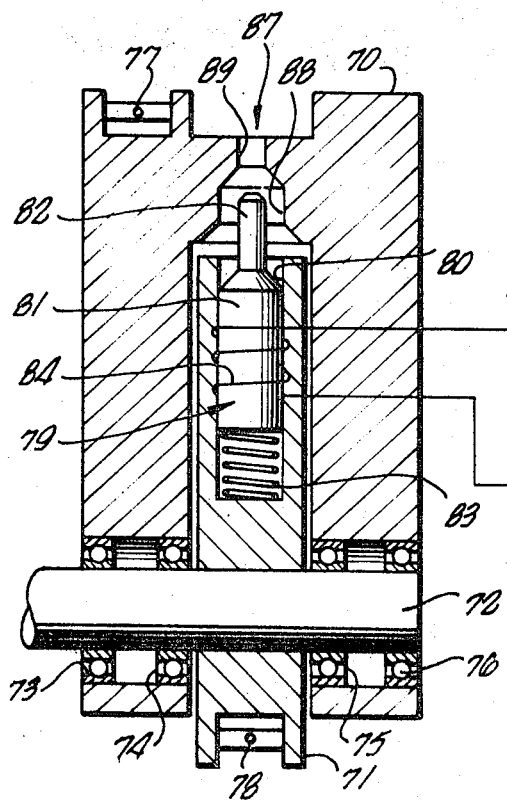
FIG_3_
INVENTOR.
EDWARD KAZMAREK
BY
Christie, Parker & Hale
ATTORNEYS

CONTROL SYSTEM WITH MULTIPLE FUNCTION CAPABILITY

BACKGROUND OF THE INVENTION

The invention relates to the field of automatic controls and, more particularly, to a control system capable of performing one of a plurality of functions on an alternative basis.

There are many applications in the field of automatic controls in which an element is to be controlled in one of a plurality of different modes of operation that have incompatible requirements. In such applications, separate servo arrangements must be provided for each mode of operation. A typical example of this situation is found in the automatic yaw axis control of an aircraft rudder during level flight and during a maneuver, such as, for example, landing. Aircraft are frequently provided with a stability augmentation system to stabilize the aircraft during level flight against extraneous movement from an attitude selected by the pilot with his control stick or pedals. To protect against the possibility that a system malfunction might damage the aircraft or cause it to go out of control, one requirement is that the stability augmentation system be given only limited authority over the rudder, i.e., that it be capable of moving the rudder only a small fraction of its total potential angle of deflection. In order that the pilot is not disturbed by the continuous movement of the rudder by the stability augmentation system as it stabilizes the aircraft, another requirement is that the output of the stability augmentation system and rudder pedals be connected to the rudder by a so-called series servo arrangement. The servoactuator, which constitutes the output of the stability augmentation system, is connected in series between the pedals and the rudder so that the movements of the pedals are coupled to the rudder without the movements of the servoactuator being felt on the pedals. In other words, the pedals are isolated from the servoactuator.

Rudder control is also frequently provided in automatic landing systems to "decrab" the aircraft, i.e., to compensate for crosswinds during the landing maneuver. The limited authority to stabilize that is given to the stability augmentation system during level flight is generally not sufficient to "decrab" the aircraft during an automatic landing maneuver in the presence of a strong crosswind. Thus, if an aircraft is provided with both an automatic landing system and a stability augmentation system, separate servo arrangements are appropriate to meet the different requirements, one servo arrangement with full authority and the other with limited authority.

To provide the pilot with a sense of the attitude of the aircraft during an automatic landing maneuver, the requirement is specified that the output of the automatic landing system and the pedals be connected to the rudder by a so-called parallel servo arrangement. The servoactuator, which constitutes the output of the automatic landing system, and the pedals form parallel inputs to control the rudder movement. Each rudder movement initiated by the servoactuator is felt on the pedals. The requirement for a parallel servo arrangement in one mode of operation and a series servo arrangement in another mode of operation also necessitates separate servo arrangements for the two operations.

Control systems with a multiple function capability are not new. For example, U.S. Pat. No. 3,020,889, issued Feb. 13, 1962, to F.A. Summerlin et al. discloses an aircraft control system capable of performing as a series servo or a parallel servo arrangement in different modes of operation. In the prior art apparatus it is not possible, however, to provide limited authority in one mode of operation and full authority in another mode of operation. Further, this apparatus is mechanically quite complex, as illustrated by the Summerlin et al. disclosure.

SUMMARY OF THE INVENTION

The invention concerns a control system in which transformation from one mode of operation to another mode of operation having different requirements is achieved by apparatus that is, mechanically speaking, relatively simple and allows different degrees of authority to be assigned to the different modes of operation. A first force-transmitting mechanism is adapted to move relative to a stationary frame responsive to a servoactuator in the control system. An element to be controlled is coupled to the first mechanism so as to move as the first mechanism moves relative to the frame. A second force-transmitting mechanism is adapted to move relative to the frame in response to a manual input device. A mechanical coupling between the first and second mechanisms is capable of assuming a first state or a second state. In the first state, the mechanisms are coupled to move relative to the frame in an independent manner within predetermined limits beyond which they move together. In the second state, the mechanisms are coupled to move completely together relative to the frame.

A transducer senses the displacement between the first and second mechanisms to produce a followup signal that is combined with an automatic control signal. The servoactuator operates responsive to the combined signal so the first mechanism follows the control signal and the movements of the manual input device, but the second mechanism does not follow the movements of the first mechanism.

The described control system meets the yaw axis requirements of both a stability augmentation system and an automatic landing system in an aircraft. When the coupling assumes its first state in a stabilization mode, the servoactuator is effectively connected in a series servo arrangement with the manual input device, i.e., the rudder pedals. Movements of the rudder pedals are sensed by the transducer and the servoactuator operates to return the first mechanism to its null position relative to the second mechanism, thereby transmitting the movements of the rudder pedals to the element to be controlled, i.e., the rudder. On the other hand, the stabilizing movements of the servoactuator responsive to the stability augmentation system are transferred through the first mechanism to the rudder without moving the second mechanism or the rudder pedals. The authority of the servoactuator responsive to the stability augmentation system is restricted to the predetermined limits of the independent movement between the first and second mechanisms. When the coupling assumes its second state in an automatic landing mode, the servoactuator and the rudder pedals supply parallel commands to the rudder. In other words, the movements of the first mechanism responsive to the servoactuator are transferred through the second mechanism to the rudder pedals. Further, the full authority available to the pilot through the rudder pedals is also available to the servoactuator.

As a feature of the invention, an alarm is actuated and the servoactuator is manually or automatically disengaged if the predetermined limits of the relative movement between the mechanisms is reached in the first state of coupling. Thereafter the second state of coupling is established so the movements of the manual input device are directly coupled through the mechanisms to the controlled element.

In one embodiment, the coupling is an axially movable pin that extends between the first and second mechanisms. The pin has a small diameter portion and a large diameter portion. In the second state, the large diameter portion of the pin fits snugly in holes through the first and second mechanisms so the mechanisms move entirely as a single unit. In the first state, the small diameter portion of the pin lies in the hole through one of the two mechanisms. Thus, relative movement between the mechanisms is possible until the pin stops up against the surface of the mechanism defining the enlarged hole. The restriction on the authority assigned to the servoactuator in the first state is determined by the relative sizes of the pin and the enlarged hole.

BRIEF DESCRIPTION OF THE DRAWINGS

The features of specific embodiments of the invention are illustrated in the drawings, in which:

FIG. 1A is a side elevation view partially in section of apparatus for allowing a control system shown schematically in block form to perform in either of two different modes of operation;

FIG. 1B is a front elevation view of the apparatus shown in FIG. 1A;

FIGS. 2A and 2B are, respectively, a side elevation view in section and a front elevation view of an alternative embodiment of the apparatus in FIGS. 1A and 1B; and FIG. 3 is a side elevation view in section of another alternative embodiment of the apparatus in FIGS. 1A and 1B.

DESCRIPTION OF SPECIFIC EMBODIMENTS

Reference is made to FIGS. 1A and 1B for the description of an aircraft control system that embodies the principles of the invention. A manual input device 1, which is depicted as the rudder pedals of the aircraft, and a servoactuator 2 are connected to a rudder 3 of the aircraft through apparatus 4. The rudder pedals would be preloaded by conventional means so they do not move until a positive predetermined force is applied thereto, thus giving them a "feel". Instead of pedals, device 1 could be a control stick or other conventional pilot operated means. Apparatus 4 comprises a rotatable shaft 5 on which a bellcrank 6 and a bellcrank 7 are mounted. The output of servoactuator 2 is coupled to shaft 5 through a clutch 8. Bellcrank 6 is fixed to shaft 5 and bellcrank 7 is rotatably supported with respect to shaft 5 by bearings 9 and 10. A rod 15 connects bellcrank 6 to rudder 3 and a rod 16 connects bellcrank 7 to manual input device 1. Rods 15 and 16 are schematically represented in FIG. 1A by dashed lines. Bellcranks 6 and 7 have axially aligned cylindrical bores 17 and 18, respectively, with substantially the same diameter. The axes of bores 17 and 18 are parallel to the axis of shaft 5. The end of bore 17 facing bellcrank 7 has an outwardly flared portion 19. A pin 20 that is axially movable within bores 17 and 18 serves as a coupling between bellcranks 6 and 7. Pin 20 has a base 21 and an extremity 22 joined by a tapered portion 23. Base 21 has a diameter slightly smaller than bores 17 and 18 to permit it to slide axially therethrough without appreciable radial play. Extremity 22 has a diameter substantially smaller than base 21 and is as long as bore 17. Portions 23 and 19 are inclined substantially at the same angle to the axis of bore 17.

A housing 30 is attached to bellcrank 7. Within housing 30 a compression spring 31 bears against a spring keeper 32, which is attached to the end of base 21. Pin 20 is operated by a solenoid 33 which is wrapped around base 21. Solenoid 33 is energized by a voltage source 34 when switches 35 and 36 are both closed. Switch 35 is manually operated by the pilot and switch 36 is operated in the manner described below. While solenoid 33 is energized, it overcomes the force of spring 31 and retains pin 20 in the position shown in FIG. 1A. Thus, the coupling between bellcranks 6 and 7 assumes a state in which the bellcranks move independently relative to the frame within predetermined limits beyond which they move together. While switch 35 and/or switch 36 are open, solenoid 33 is deenergized and spring 31, acting against spring keeper 32, slides base 21 into bore 17. Thus, the coupling between bellcranks 6 and 7 assumes a state in which the bellcranks move completely together. As base 21 slides into bore 17, it is centered on the axis of bore 17 by the interaction between portions 19 and 23.

A conventional stability augmentation system 37 is coupled to the input of servoactuator 2 through a signal limiter 38, a manually operated two position switch 39, and an electrical summing junction 40. Thus, servoactuator 2 is in part driven responsive to the electrical flight-stabilizing signal generated by stability augmentation system 37. A displacement transducer 41, such as a differential transformer, generates an electrical signal indicative of the relative displacement between bellcranks 6 and 7. The signal generated by transducer 41 is fed back as a followup through an amplifier 49 to summing junction 40 where it is combined with the signal generated by stability augmentation system 37. Thus, servo actuator 2 is also in part responsive to the signal generated by transducer 41. Most conveniently, transducer 41 is set so the null position of bellcranks 6 and 7 occurs when the axes of bores 17 and 18 are aligned. The yaw axis control of a conventional automatic maneuver system 42, e.g., a landing system that has a decrabbing capability, is coupled to the input of servoactuator 2 through an electrical summing junction 43, switch 39, and summing junction 40. A displacement transducer 44, such as a differential transformer, generates an electrical signal indicative of the displacement of bellcrank 7 relative to a stationary frame 45, which in this particular environment, is the superstructure of the aircraft. The signal generated by transducer 44 is fed back as a followup to summing junction 43 where it is combined with the signal generated by system 42.

When the control system of FIGS. 1A and 1B is performing normally in a stabilization mode of operation during level flight of the aircraft, switch 39 is in its upper position and switches 35 and 36 are closed, as depicted in FIG. 1A. Extremity 22 lies within bore 17 so relative movement can take place between bellcranks 6 and 7. As stability augmentation system 37 generates electrical command signals to compensate for the extraneous movements of the aircraft about its yaw axis, servoactuator 2 controls rudder 3 accordingly. The rotation of shaft 5 responsive to servoactuator 2 is transferred by bellcrank 6 to rudder 3, but is not transferred through bellcrank 7 to manual input device 1 as long as the movements of bellcrank 6 do not exceed the difference in diameter between bore 17 and extremity 22. This difference defines the limitation on the mechanical authority of servoactuator 2 to control rudder 3. Upon the movement of manual input device 1 by the pilot, transducer 41 generates a signal that is applied to summing junction 40. Consequently, servoactuator 2 drives shaft 5 to recenter extremity 22 within bore 17, i.e., to reestablish the null position between bellcranks 6 and 7. In the course of the reestablishment of the null position, rudder 3 is moved an amount related to the movement of manual input device 1 and the authority of servoactuator 2 remains unchanged. Thus, the control system functions as a series servo arrangement in the stabilization mode.

The gain of amplifier 49 and the limiting value of limiter 38 are set so under normal operating conditions bellcrank 6 does not move sufficiently far in the course of stabilization to run up against extremity 22. Thus, if this does occur, a malfunction is indicated. Thereafter, no further movement of bellcrank 6 is possible without a corresponding movement of bellcrank 7 and, therefore, manual input device 1. Thus, the pilot is apprised of the malfunction through his control stick. In addition, an annular pressure-actuated switch 46 attached to the wall of bore 17 operates a visual or audible alarm 47 to alert the pilot to the malfunction. When the pilot is apprised of the malfunction, he can manually disengage clutch 8 to render stability augmentation system 37 inoperative and open switch 36 to change the coupling between bellcranks 6 and 7 to the second state. Preferably, however, clutch 8 is disengaged and switch 36 is opened automatically responsive to switch 46 as represented by dashed line 48. After clutch 8 is disengaged and switch 36 is opened, rudder 3 no longer moves responsive to servoactuator 2, but does move responsive to manual input device 1 due to the direct coupling established through bellcranks 6 and 7.

In some control systems it may be desirable to keep the coupling between bellcranks 6 and 7 in the first state at all times in a particular mode by leaving switch 36 closed regardless of whether extremity 22 moves up against the wall of bore 17. When the pilot moves manual input device 1, in such case extremity 22 moves up against the wall of bore 17 and carries bellcrank 6 with bellcrank 7, thereby moving rudder 3.

When the control system of FIGS. 1A and 1B is performing in an automatic maneuver mode of operation, switch 39 is in its lower position and switch 35 is open. Base 21 lies within bore 17 so no appreciable play exists in the coupling between bellcranks 6 and 7, and the electrical command signals generated by automatic maneuver landing system 42 are coupled to servoactuator 2. As servoactuator 2 drives shaft 5, bellcranks 6 and 7 rotate as a single unit and transducer 41 produces no output signal. The rotation of shaft 5 transferred by bellcrank 6 to rudder 3 is also transferred by bellcrank 7 to manual input device 1. Thus, the full authority available to manual input device 1 is also available to servoactuator 2 for the performance of its control function and the control system operates as a parallel servo arrangement. Depending on the circumstances, the authority of the maneuver operation could be limited by a limiter connected between system 42 and summing junction 43.

In FIGS. 2A and 2B, an alternative embodiment of apparatus 4 is shown. A bellcrank 50 and a bellcrank 51 are mounted on a rotatable shaft 52, which is driven by servoactuator 2 (FIG. 1A). Bellcrank 50 is fixed to shaft 52 and bellcrank 51 is rotatably supported with respect to shaft 52 by bearings 53 and 54. A rod 55 connects bellcrank 50 to rudder 3 (FIG. 1A), and a rod 56 connects bellcrank 51 to manual input device 1 (FIG. 1A). A cylinder 57 is disposed within a cavity 58 in bellcrank 51. Cylinder 57 is constrained to move within cavity 58 in a direction transverse to the axis of shaft 52. A compression spring 59 bears against a spring keeper 60 on the end of cylinder 57, thereby urging cylinder 57 downward as viewed in FIG. 2A. A solenoid 61 is wrapped around an extension 62 of cylinder 57. Solenoid 61 is energized by a voltage source 63 when a switch 64 is closed. While solenoid 61 is energized, it overcomes the force of spring 59 and holds cylinder 57 at the top of cavity 58 as illustrated in FIG. 2A. While switch 64 is open, solenoid 61 is deenergized and spring 59, acting against spring keeper 60, drives cylinder 57 to the bottom of cavity 58. A pin 65 extends transversely from the top of cylinder 57 through a slot 66 in the side of bellcrank 51 adjacent to bellcrank 50 and into a hole 67 in bellcrank 50. As illustrated in FIG. 2B, the top of hole 67 is substantially larger than the diameter of pin 65 so that substantial play exists in the coupling between bellcranks 50 and 51 when cylinder 57 is disposed at the top of cavity 58. Accordingly, while switch 64 is closed, bellcranks 50 and 51 move in a mutually independent manner within predetermined limits beyond which they move together. When cylinder 57 is disposed at the bottom of cavity 58, pin 65 drops to the bottom of hole 67, as depicted by the dashed outline in FIG. 2B, where it rests snugly without appreciable radial play. Accordingly, while switch 64 is open, bellcranks 50 and 51 move together without appreciable play.

In FIG. 3 another alternative embodiment of apparatus 4 is shown. A bellcrank 70 and a bellcrank 71 disposed between the sides of bellcrank 70 are mounted on a rotatable shaft 72, which is driven by servoactuator 2 (FIG. 1A). Bellcrank 71 is fixed to shaft 72 and bellcrank 70 is rotatably supported with respect to shaft 72 by bearings 73, 74, 75 and 76. A rod 77 connects bellcrank 70 to manual input device 1 (FIG. 1A) and a rod 78 connects bellcrank 71 to rudder 3 (FIG. 1A). A pin 79 is constrained to move within a cavity 80 in bellcrank 71 in a direction transverse to the axis of shaft 72. Pin 79 has a base 81 with a large diameter and an extremity 82 with a small diameter. A compression spring 83 urges pin 79 in an upward direction as viewed in FIG. 3. A solenoid 84 is wrapped around base 81. Solenoid 84 is energized by a voltage source 85 when a switch 86 is closed. While solenoid 84 is energized, it overcomes the force of spring 83 and retains base 81 near the bottom of cavity 80 as shown in FIG. 3. While switch 86 is open, solenoid 84 is deenergized and spring 83, acting against the bottom end of base 81, drives pin 79 upward into a hole 87 in bellcrank 70. Hole 87 has a portion 88 with a diameter slightly larger than the diameter of base 81 and a portion 89 with a diameter slightly larger than extremity 82. When pin 79 is disposed near the bottom of cavity 80, as depicted in FIG. 3, extremity 82 lies within portion 88 and substantial play exists in the coupling between bellcranks 70 and 71. Accordingly, while switch 86 is closed, bellcranks 70 and 71 move in a mutually independent manner within predetermined limits beyond which they move together. When pin 79 is driven upward, thereby penetrating fully into hole 87, extremity 82 fits snugly in portion 89 and base 81 fits snugly in portion 88 without appreciable radial play. Accordingly, while switch 86 is open, bellcranks 70 and 71 move together without appreciable play.

The embodiments of apparatus 4, illustrated in FIGS. 2A and 2B and FIG. 3, are particularly advantageous and in practice preferred to the embodiment of FIGS. 1A and 1B because force is exerted in a direction parallel to the length of the bellcranks during a change in the state of the coupling therebetween. Thus, negligible torque is developed at the point of connection of the shaft to the bellcranks, whereas a substantial torque is developed in the embodiments of FIGS. 1A and 1B.

Many modifications of the disclosed embodiments fall within the scope of the invention. For example, instead of a pin and a hole to couple the mechanisms, a bearing and cam could be utilized. Further, instead of a rotational output from the servoactuator, a translational one could be employed.

I claim:

1. A control system comprising:
a stationary frame;
a servoactuator;
a first force transmitting mechanism adapted to move relative to the frame in response to the servoactuator;
a manual input device;
a second force transmitting mechanism adapted to move relative to the frame in response to the manual input device;
mechanical coupling means between the first and second mechanisms capable of assuming either a first state or a second state, the mechanisms being coupled in the first state in move independently relative to the frame and being coupled in the second state to move together relative to the frame;
means for sensing the displacement between the first and second mechanisms from a null position, the servoactuator operating responsive to the displacement sensed by the sensing means to return the first mechanism to the null position relative to the second mechanism; and
an element to be controlled connected to the first mechanism such that the element is controlled as the first mechanism moves relative to the frame.

2. The control system of claim 1, in which the mechanisms are coupled to move independently relative to the frame in the first state within predetermined limits beyond which they move together relative to the frame.

3. The control system of claim 1, in which the servoactuator operates responsive to a source of electrical signals representing a command input as well as the means for sensing the displacement between the first and second mechanisms.

4. The control system of claim 1, in which the servoactuator operates responsive to the output of a summing junction, the means for sensing the displacement between the first and second mechanisms from a null position produces a signal applied to one input of the summing junction, and an electrical signal representing a command input is applied to another input of the summing junction.

5. The control system of claim 1, in which the servoactuator drives a shaft, the first mechanism is fixed to the shaft, the second mechanism is rotatably supported with respect to the shaft, the coupling means between the first and second mechanisms comprises a hole in one of the mechanisms and a pin that is connected to the other mechanism without appreciable play in the direction of rotation of the shaft, and the pin is movable within the hole transverse to the direction of rotation of the shaft to assume either the first or second state, the pin being adapted to fit in the hole with substantial play in the first state and to fit snugly in the hole without appreciable play in the second state.

6. The control system of claim 5, in which the axis of the pin is parallel to the axis of the shaft, the pin has a base with a larger diameter than its extremity that adjoins the one mechanism, the hole is a cylindrical bore with a diameter slightly larger than the base of the pin and alignable therewith, and the pin is axially moveable.

7. The control system of claim 6, in which the pin has a tapered portion connecting the base and the extremity and the portion of the hole facing the other mechanism is flared to match the angle of the tapered portion of the pin.

8. The control system of claim 5, in which the axis of the pin is parallel to the axis of the shaft, the pin extends from the other mechanism into the hole of the one mechanism, the pin is connected to the other mechanism without appreciable play in the direction of rotation of the shaft, the pin is movable in a radial direction from the shaft, and the hole is dimensioned so the pin fits in a wide portion of the hole with substantial play when the pin assumes the first state and the pin fits snugly in a narrow portion of the hole without appreciable play when the pin assumes the second state.

9. The control system of claim 5, in which the axis of the pin is radially perpendicular to the axis of the shaft, the pin is axially movable, the pin has an extremity with a smaller diameter than its base, the one mechanism has a portion extending transverse to the pin, the hole is located in the transverse portion of the one mechanism so it is axially alignable with the pin, the portion of the hole facing the pin has a diameter slightly larger than the base of the pin, and the portion of the hole facing away from the pin has a diameter slightly larger than the extremity of the pin, the extremity of the pin lying within the larger portion of the hole in the first state and lying within the smaller portion of the hole in the second state.

10. An aircraft control system comprising:
an aircraft frame;
a first source of command signals for controlling the aircraft in one mode;
a second source of command signals for controlling the aircraft in another mode;
a servoactuator;
means for alternatively connecting the first and second sources to the servoactuator;
a first member supported to move relative to the frame responsive to the servoactuator;
an aircraft control surface coupled to the first member such that the control surface is controlled as the first member moves relative to the frame;
a pilot operated input device;
a second member supported to move relative to the frame responsive to the pilot operated input device;
means for coupling the first and second members to move together relative to the frame without appreciable play when the first source is connected to the servoactuator; and
means for disengaging the coupling means to permit independent movement of the first and second members relative to the frame within predetermined limits when the second source is connected to the servoactuator, the members moving together after the predetermined limits are reached.

11. The control system of claim 10, in which the displacement between the first and second members from a null position is sensed and the first member moves responsive to the sensed displacement as well as the first source so the first member follows the pilot operated input device when the coupling means are disengaged.

12. A control system comprising:
a stationary frame;
a first input device that produces an indication of a command;
a first member supported to move relative to the frame;
a device to be controlled coupled to the first member such that the device is controlled as the first member moves relative to the frame;
a second input device that produces an indication of a command;

a second member supported to move relative to the frame responsive to the second input device, the second member being movable independently of the first member;
means for indicating the displacement between the first and second members from a null position;
means for combining the indications of the first input device and the displacement indicating means; and
means responsive to the combining means for moving the first member in a sense to reduce the difference between the indications.

13. The control system of claim 12, in which means are provided for coupling the first and second members to move together relative to the frame without appreciable play and means are provided for disengaging the coupling means to permit independent movement of the first and second members relative to the frame.

14. A control system comprising:
a stationary frame;
a first input source;
a first force transmitting member;
means for connecting the first input source to the first force transmitting member to move the first force transmitting member relative to the frame responsive to the first input source;
a device to be controlled connected to the first force transmitting member such that the device is controlled as the first force transmitting member moves relative to the frame;
a second input source;
a second force transmitting member;
means for connecting the second input source to the second force transmitting member to move the second member relative to the frame responsive to the second input source;
a mechanical coupling device between the first and second force transmitting members that is capable of assuming either a first state or a second state, the members being coupled in the first state to move independently relative to the frame within predetermined limits and being coupled in the second state to move together relative to the frame; and
means for disengaging the connecting means between the first input source and the first member when the relative movement between the first and second members reaches the predetermined limit.

15. The control system of claim 14, in which the connecting means between the first input source and the first member is a clutch.

16. The control system of claim 14, in which the coupling device couples the first and second members in the first state so they move together beyond the predetermined limits.

17. The control system of claim 16, in which the displacement between the first and second members from a null position is sensed and the first input source represents the sensed displacement so as to return the first member to the null position relative to the second member.

18. The control system of claim 14, in which the coupling changes from the first state to the second state when the relative movement between the first and second members reaches the predetermined limit.

19. A yaw axis control system for an aircraft comprising:
a stability augmentation system for generating an electrical signal to control the course of the aircraft;
a servoactuator;
a first force transmitting mechanism supported to move relative to the frame of the aircraft in response to the servoactuator;
a pilot operated input device;
a second force transmitting mechanism supported to move relative to the frame of the aircraft in response to the pilot operated input device;

mechanical coupling means between the first and second mechanisms capable of assuming either a first state or a second state, the mechanisms being coupled in the first state to move independently relative to the frame and being coupled in the second state to move together relative to the frame;

an automatic maneuver system for generating electrical signals to control the course of the aircraft during landing;

means for connecting the stability augmentation system to the input of the servoactuator while the coupling means is in the first state; and means for connecting the automatic maneuver system to the input of the servoactuator while the coupling means is in the second state.

20. The control system of claim 19, in which a transducer produces a signal representing the displacement between the first and second mechanisms from a null position and transducer is also connected to the input of the servoactuator so the servoactuator operates responsive to the combination of the transducer signal and the stability augmentation system signal to reduce the combination.

21. The control system of claim 20, in which the mechanisms are coupled to move independently relative to the frame in the first state within predetermined limits beyond which they move together relative to the frame.

22. The control system of claim 19, in which the mechanisms are coupled to move independently relative to the frame in the first state within predetermined limits beyond which they move together relative to the frame.